(12) United States Patent
Routeau et al.

(10) Patent No.: US 10,139,014 B2
(45) Date of Patent: Nov. 27, 2018

(54) DEVICE FOR CONTROLLING THE FILLING OF A PIPE AS IT IS BEING LAID IN A STRETCH OF WATER, AND ASSOCIATED ASSEMBLY AND METHOD

(71) Applicant: TECHNIP FRANCE, Courbevoie (FR)

(72) Inventors: Sylvain Routeau, Saint Cloud (FR); Emilie Lachaud, Villejuif (FR); Rémi Friville, Prunay-Cassereau (FR); Tegwen De Kerdanet, Paris (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 15/566,791

(22) PCT Filed: Apr. 14, 2016

(86) PCT No.: PCT/EP2016/058280
§ 371 (c)(1),
(2) Date: Oct. 16, 2017

(87) PCT Pub. No.: WO2016/166248
PCT Pub. Date: Oct. 20, 2016

(65) Prior Publication Data
US 2018/0135777 A1     May 17, 2018

(30) Foreign Application Priority Data

Apr. 16, 2015 (FR) ...................... 15 53403

(51) Int. Cl.
*F16L 1/00*     (2006.01)
*F16L 1/12*     (2006.01)
(Continued)

(52) U.S. Cl.
CPC ............... *F16L 1/163* (2013.01); *F16L 1/235* (2013.01)

(58) Field of Classification Search
CPC .......... B63B 35/03; E02F 5/104; E02F 5/105; F16L 1/00; F16L 1/12; F16L 1/166;
(Continued)

(56) References Cited

U.S. PATENT DOCUMENTS 3,563,258 A * 2/1971 Hechler, IV ........... B65D 49/04
137/1
4,360,290 A * 11/1982 Ward ................... E21B 43/0107
138/89

(Continued)

FOREIGN PATENT DOCUMENTS

FR     1 288 732 A      3/1962
FR     1 289 421 A      4/1962
WO    WO 02/084160 A1  10/2002

OTHER PUBLICATIONS

International Search Report dated Jun. 27, 2016 in corresponding PCT International Application No. PCT/EP2016/058280.
(Continued)

*Primary Examiner* — Benjamin F Fiorello
*Assistant Examiner* — Edwin J Toledo-Duran
(74) *Attorney, Agent, or Firm* — Ostrolenk Faber LLP

(57) ABSTRACT

A device includes an upstream section defining a water introduction inlet; an injector for injecting a process fluid into the water introduced into the upstream section; an intermediate section mounted downstream of the injector for receiving the water containing the process fluid; a downstream section for conveying water to the fluid transport pipe being laid. The device also includes a liquid volume compensation reservoir, having a variable receiving volume of water discharged from the fluid transport pipe, a connector to which are connected the intermediate section, the downstream section and the liquid volume compensation reservoir, wherein the inlet cross-section of the compensation reservoir is greater than 40 times the internal cross-section
(Continued)

of the intermediate section taken at the connector. This device operates reliably even when the stretch of water is rough.

18 Claims, 3 Drawing Sheets

(51) Int. Cl.
*F16L 1/20* (2006.01)
*F16L 1/23* (2006.01)
*F16L 1/24* (2006.01)
*F16L 1/26* (2006.01)
*F16L 1/16* (2006.01)
*F16L 1/235* (2006.01)

(58) Field of Classification Search
CPC ..... F16L 1/20; F16L 1/205; F16L 1/23; F16L 1/235; F16L 1/24; F16L 1/26
USPC ...................................... 405/154.1, 158–173
See application file for complete search history.

(56) References Cited

U.S. PATENT DOCUMENTS

| | | | | | |
|---|---|---|---|---|---|
| 4,390,043 | A * | 6/1983 | Ward | ................ | F16L 55/1283 138/89 |
| 4,441,328 | A * | 4/1984 | Brister | ................ | F25D 3/10 138/89 |
| 5,927,901 | A * | 7/1999 | Graves | ................ | F16L 55/46 138/97 |
| 6,494,824 | B1 * | 12/2002 | Apple | ................ | A61M 5/1785 600/3 |
| 2003/0026662 | A1 * | 2/2003 | Vidal | ................ | F16L 1/123 405/157 |
| 2003/0099515 | A1 * | 5/2003 | Giovannini | ............ | F16L 1/166 405/158 |
| 2003/0234012 | A1 * | 12/2003 | Bosteels | ............ | B01D 53/9431 123/670 |
| 2003/0235471 | A1 * | 12/2003 | Bass | ................ | F16L 53/37 405/154.1 |
| 2007/0220873 | A1 * | 9/2007 | Bosteels | ............ | B01D 53/9413 60/299 |
| 2007/0228071 | A1 * | 10/2007 | Kamen | ................ | G05D 7/0647 222/52 |
| 2007/0266632 | A1 * | 11/2007 | Tsangaris | ................ | C10J 3/18 48/190 |
| 2008/0128129 | A1 * | 6/2008 | Yeh | ................ | E21B 17/02 166/275 |
| 2010/0089126 | A1 * | 4/2010 | Sweeney | ................ | B63C 11/42 73/40 |
| 2010/0140288 | A1 * | 6/2010 | Jones | ................ | B01F 15/0244 222/1 |
| 2010/0147056 | A1 * | 6/2010 | Stolle | ................ | G01N 17/002 73/86 |
| 2010/0200609 | A1 * | 8/2010 | Cadigan | ................ | B60S 1/50 222/1 |
| 2011/0114329 | A1 * | 5/2011 | Emecheta | ............ | E21B 33/0355 166/350 |
| 2012/0298216 | A1 * | 11/2012 | Geertsen | ................ | F16L 53/32 137/340 |
| 2013/0153038 | A1 * | 6/2013 | Barden | ................ | G01M 3/005 137/1 |
| 2013/0247867 | A1 * | 9/2013 | Shmueli | ............... | F02M 25/028 123/25 A |
| 2013/0284768 | A1 * | 10/2013 | Jones | ................ | B01F 15/0244 222/527 |
| 2014/0091574 | A1 * | 4/2014 | Favy | ................ | F02C 6/16 290/52 |
| 2015/0362124 | A1 * | 12/2015 | Favy | ................ | F02C 6/16 206/0.6 |
| 2018/0073666 | A1 * | 3/2018 | Barnes | ................ | F16L 58/1036 |

OTHER PUBLICATIONS

Written Opinion dated Jun. 27, 2016 in corresponding PCT International Application No. PCT/EP2016/058280.

* cited by examiner

DEVICE FOR CONTROLLING THE FILLING OF A PIPE AS IT IS BEING LAID IN A STRETCH OF WATER, AND ASSOCIATED ASSEMBLY AND METHOD

CROSS-REFERENCE TO RELATED APPLICATIONS

The present application is a 35 U.S.C. §§ national phase conversion of PCT/EP2016/058280, filed Apr. 14, 2016, which claims priority to French Patent Application No. 1553403, filed Apr. 16, 2015, the contents of which are incorporated herein by reference. The PCT International Application was published in the French language.

BACKGROUND AND SUMMARY OF THE INVENTION

The present invention relates to a device for controlling the filling of a pipe being laid in a stretch of water, comprising:
an upstream section defining a water introduction inlet;
an injector for injecting a process fluid into the water introduced into the upstream section;
an intermediate section mounted downstream of the injector to receive the water containing process fluid;
a downstream section for conveying water to the fluid transport pipe being laid.

Such a device is designed to be mounted at the lower end of a fluid transport pipe being laid, in order to filter and/or treat the water introduced into the fluid transport pipe while it is being laid.

The fluid transport pipe is, for example, a rigid pipe formed by an assembly of pipe sections welded successively on a laying barge ("J Lay" and "S Lay" laying methods) or unwound from a laying barge ("Reel Lay" laying method).

For various reasons, it may be advantageous to lay the pipe partially filled with water, in particular to stabilize the pipe on the seabed during the laying operation. The water filling is carried out via an orifice located on the lower end of the pipe laid on the seabed (a so-called "free flooding" method). In this case, it is often necessary to filter and/or treat the water that enters the pipe.

A device for controlling the filling of the pipe of the aforesaid type, designated by the term "Passive Flooding Unit" or "PFU" is known, for example, from WO 02/084160. Such a device is suitable for flooding the pipe in a passive manner, filtering the water introduced into the pipe and, in particular, treating it with a process fluid to prevent corrosion. The aforesaid devices generally comprise a reservoir of process fluid, which is of a finite volume.

Such a device works correctly when the laying barge floats on a stretch of water that is not very rough. However, when the stretch of water is rough, the pipe being laid is subjected to variations in height due to the local movements of the stretch of water.

When the upper end of the pipe goes down, an extra volume of water is drawn through the control device by a suction effect. While, when the pipe rises, the additional volume of water is forced back through the control device in the opposite sense.

This is not desirable insofar as the displaced water contains process fluid which may be expensive and/or environmentally harmful. In addition, this phenomenon of suction and discharge also occurs when laying of the pipe is interrupted. Since the duration of the interruption periods is not predictable, the required amount of process fluid is difficult to predict. The required amount is not simply proportional to the volume of the pipe.

Moreover, given the compressibility of water and the oscillations of the fluid transport pipe, resonance phenomena may occur. These phenomena cause a very significant suction of liquid, followed by an ejection which may damage the control device, and, in particular, the pumps of the equipment for injecting the process fluid. This resonance phenomenon makes the evaluation of the volume of process fluid required even more unreliable.

An object of the invention is to provide a device for controlling the filling of a fluid transport pipe while it is being laid in a stretch of water, and which allows the laying of the pipe by partially filling it with water coming from the stretch of water, wherein the device operates reliably even when the stretch of water is rough.

To this end, the subject-matter of the invention is to provide a device of the aforementioned type, characterized in that it comprises:
a liquid volume compensation reservoir, having a variable receiving volume for water discharged from the fluid transport pipe,
a connector to which are connected the intermediate section, the downstream section and the liquid volume compensation reservoir, the inlet cross-section of the liquid volume compensation reservoir taken at the connector being greater than 40 times the internal cross-section of the intermediate section taken at the connector.

The device according to the invention may comprise one or more of the following characteristics taken individually or in any technically feasible combination:
the inlet cross-section of the liquid volume compensation reservoir at the connection is greater than 150 times the internal cross-section of the intermediate section taken at the connector;
the liquid volume compensation reservoir comprises a delimiting member to limit the receiving volume, and which may be displaced or deformed in order to modify the receiving volume, the delimiting member being, in particular, a piston or a membrane, a face of the delimiting member opposite the receiving volume being subjected to the hydrostatic pressure of the stretch of water;
the delimiting member is adapted to be displaced or deformed when the absolute value of the difference between the pressure in the receiving volume and the hydrostatic pressure in the stretch of water applied to the delimiting member is greater than or equal to 0.1 bar, advantageously greater than or equal to 0.05 bar, more advantageously greater than or equal to 0.01 bar;
the maximum receiving volume accommodated by the liquid volume compensation reservoir is greater than 100 liters;
the injector for injecting the process fluid comprises a pump discharging into the intermediate section;
the pump is a passive pump which may be actuated by the water introduced through the upstream section, or may be an active pump comprising at least one electric or hydraulic pump motor;
the injector for injecting the process fluid comprises a reservoir of process fluid, mounted upstream of the pump;
the process fluid contains a corrosion inhibitor and/or a biocide;

the device comprises a filter, inserted on the upstream section, upstream of the injector for injecting processing fluid;

the downstream section is formed of a flexible pipe.

The invention also relates to a fluid conveying assembly, comprising:

a fluid transport pipe having a lower end located in the vicinity of the bottom of a stretch of water and an upper end;

a device as described above, wherein the downstream section is mounted at the lower end of the fluid transport pipe, wherein the upstream section opens into the stretch of water.

The assembly according to the invention may comprise one or more of the following characteristics taken individually or in any technically feasible combination:

the lower end of the fluid transport pipe is provided with a section reducer defining a water inlet opening in the fluid transport pipe, the water inlet opening having a diameter smaller than the diameter of the fluid transport pipe, and wherein the downstream section opens into the water inlet opening;

the cross-section of the water inlet opening is less than 5% of the cross-section of the fluid transport pipe.

The subject-matter of the invention also relates to a method of laying a fluid transport pipe in a stretch of water comprising the following steps:

lowering of an assembly as defined above in a stretch of water;

progressive filling of the fluid transport pipe with water from the stretch of water through the upstream section, the intermediate section, the connector and the downstream section, and injection of process fluid by the fluid injector into the water introduced into the transport pipe;

partial discharge of water from the fluid transport pipe through the downstream section;

filling the receiving volume of the liquid volume compensation reservoir with the water discharged from the fluid transport pipe.

BRIEF DESCRIPTION OF THE DRAWINGS

The invention may be better understood by reading the description which follows and is given solely by way of example, and refers to the accompanying drawings.

DESCRIPTION OF PREFERRED EMBODIMENTS

In the following, the terms "upstream" and "downstream" are generally understood with respect to the normal direction of circulation of a petroleum fluid in the pipe from bottom to top in the stretch of water.

Figure 1:
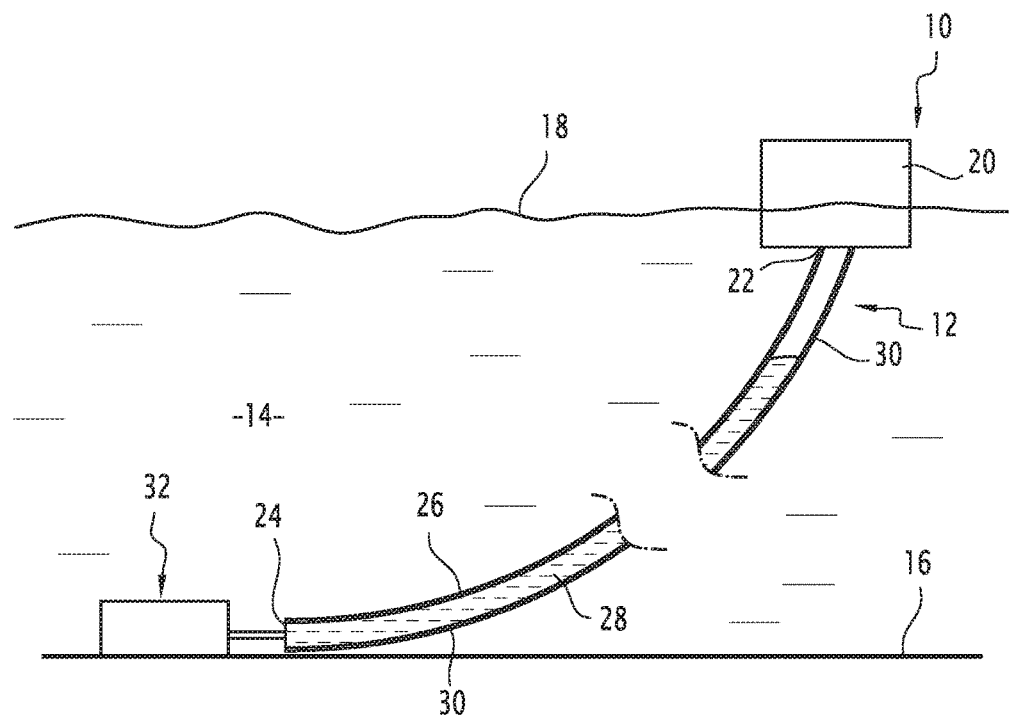
FIG. 1 shows a schematic side view, in partial section, of a device for laying a fluid transport pipe, wherein the pipe is provided at its lower end with a device according to the invention for controlling the filling of the pipe.

An installation 10 for laying a fluid transport pipe 12 in a stretch of water 14 is illustrated partially in FIG. 1.

The installation 10 is for example intended to lay the pipe 12 between a bottom assembly (not shown) suitable for drawing hydrocarbons from the bottom of the stretch of water 14, and a collection assembly on the surface 18 (not shown).

The stretch of water 14 is, for example, a sea, a lake or an ocean. The depth of the stretch of water 14 at the level of the installation 10 between the surface 18 and the bottom 16 is, for example, between 50 and 3000 meters. The present invention could also advantageously be used to depths greater than 3000 m, because the greater the depth, the greater the suction and discharge phenomena to be compensated.

Figure 3:
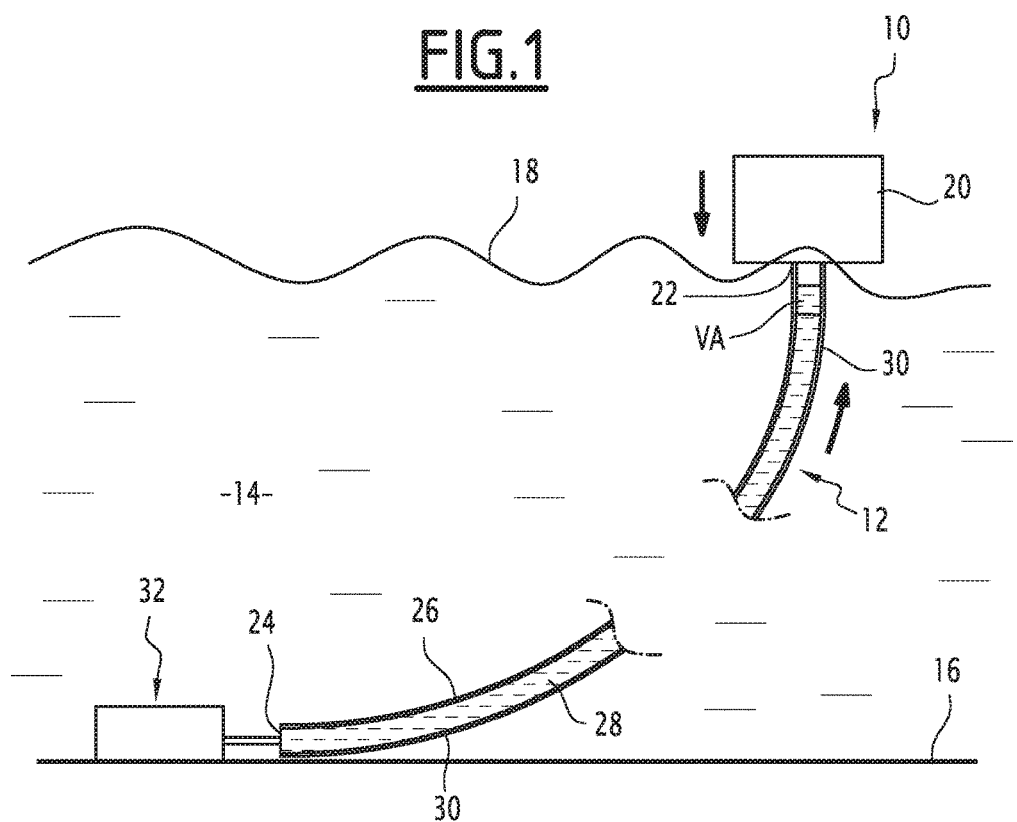
FIG. 3 shows a view similar to FIG. 1, during a lowering of the surface assembly to lay the fluid transport pipe, under the effect of the movements of the stretch of water.
Figure 4:
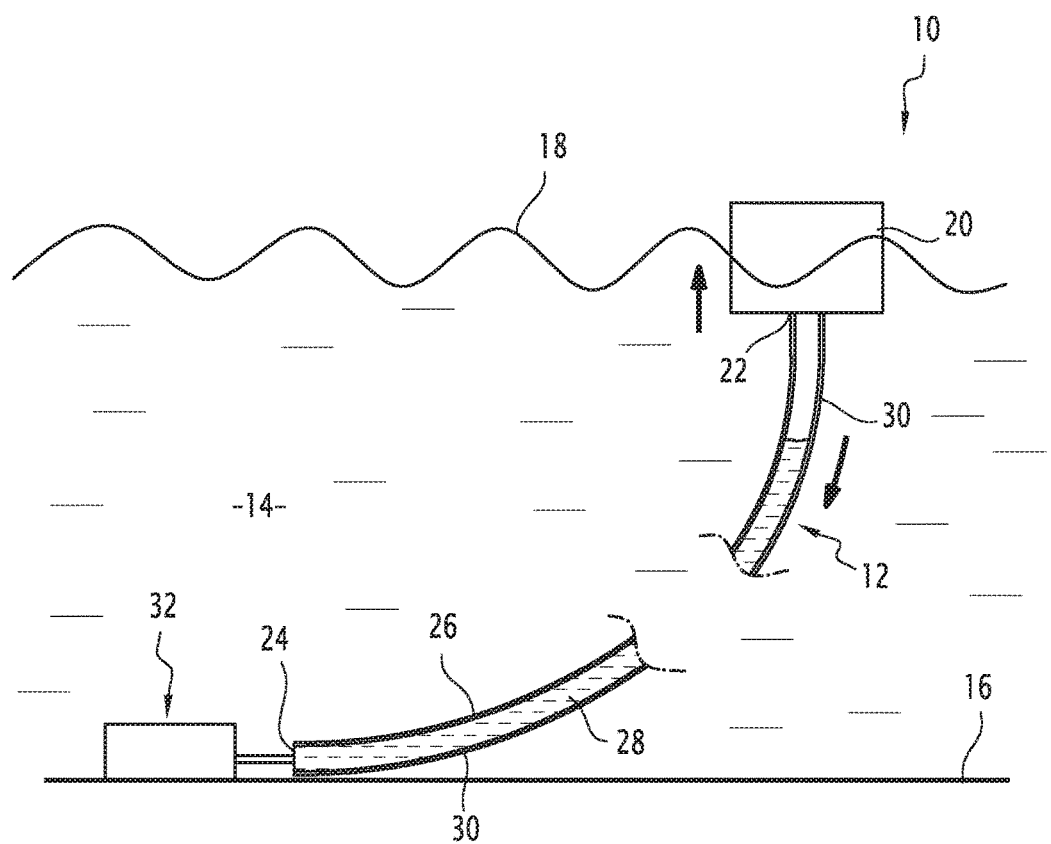
FIG. 4 shows a view similar to FIG. 3, during raising of the surface assembly laying the fluid transport pipe, under the effect of the movements of the stretch of water.

The surface 18 of the stretch of water 14 is subjected locally to an oscillating movement varying its height, such as the swell, as illustrated by FIG. 3 and by FIG. 4.

The installation 10 comprises at least one floating surface assembly 20 for laying the fluid transport pipe 12.

The surface assembly 20 is, for example, a laying barge. Alternatively, the surface assembly 20 may be a floating platform.

The surface assembly 20 is subjected to a variation in height as a function of the movements of the surface 18, which depend, in particular, on the swell.

The variation in height of the surface assembly 20 advantageously has an amplitude ranging from 0 meters to 5 meters over periods ranging from 4 seconds to 18 seconds.

The surface assembly 20 comprises equipment for laying the fluid transport pipe 12.

The laying equipment includes, for example, tensioners and welding units. In this case, the laying equipment is able to sequentially assemble sections of the pipe 12 allowing it to be lowered progressively into the stretch of water 14. Alternatively, the laying equipment may comprise an unwinder that is suitable for progressively unwinding a length of the pipe 12 to be lowered into the stretch of water 14.

The fluid conveying pipe 12 is intended to be immersed progressively in the stretch of water 14 from the surface assembly 20.

With reference to FIG. 1, the pipe 12 extends between an upper end 22, disposed on the surface 18 or in the vicinity thereof, and a lower end 24 which is here disposed in the vicinity of the bottom 16 of the stretch of water 14.

The pipe 14 comprises a sealed tubular wall 26 defining an internal passage 28 opening downwards at the lower end 24 and upwards at the upper end 22. The pipe 14 here has a circular cross-section.

The pipe 14 advantageously has an internal diameter of between 75 millimeters and 1 meter and a length of between 500 meters and 100 kilometers. It extends as a catenary between the upper end 22 and the bottom 16.

The pipe 14 is advantageously a rigid metal pipe formed by an assembly of sections 30. Alternatively, the pipe 14 may be a flexible pipe.

The upper end 22 is disposed above the level of the surface 18 of the stretch of water 14 on the surface assembly 20, or in a gas volume situated beneath the surface 18 of the stretch of water 14.

In the example shown, the lower end 24 rests on the bottom 16 of the stretch of water 14. Alternatively, the lower end 24 may be disposed freely in the stretch of water 14.

Figure 2:
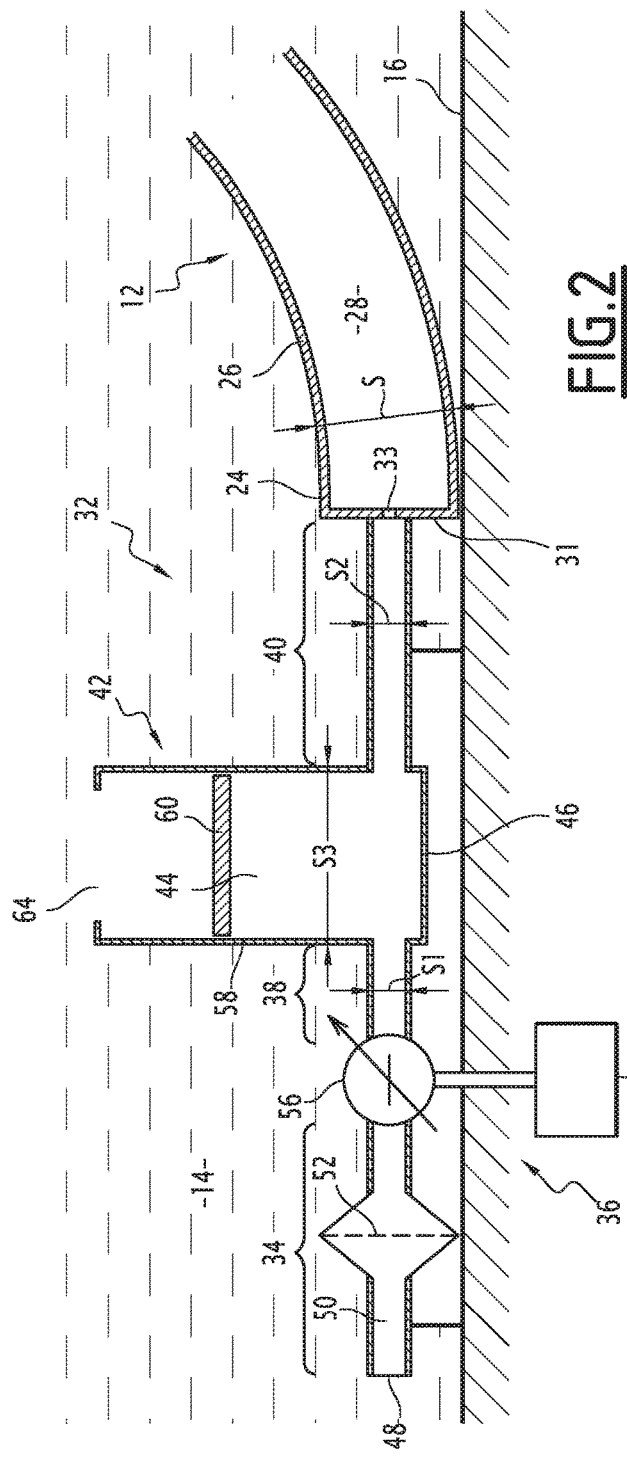
FIG. 2 shows a schematic side view, in partial section, of the filling control device visible in FIG. 1.

As may be seen in FIG. 2, the lower end 24 of the fluid transport pipe 12 is provided with a section reducer 31 defining a water inlet opening 33 in the fluid transport pipe 12.

The section reducer 31 may be, for example, a pierced plug mounted in the passage 28 at the lower end 24.

The opening 33 has a cross-section very much smaller than the internal cross-section of the fluid transport pipe 12. Advantageously, the cross-section of the opening 33 is less than or equal to 5% of the internal cross-section of the fluid transport pipe 12 in the passage 28 away from the member 31. Preferably, the cross-section of the opening 33 is between 1% and 4% of the internal cross-section of the fluid transport pipe 12 in the passage 28 away from the member 31.

In the case where the opening 33 has a circular cross-section, the diameter of the opening 33 is, for example, equal to 10 mm, 20 mm, 40 mm or 200 mm for a fluid transport pipe 12 having an internal diameter respectively equal to 75 mm, 150 mm, 400 mm or 1000 mm.

During the laying of the pipe 12, the internal passage 28 is at least partially flooded with water coming from the stretch of water 14.

The presence of a section reducer 31 associated with a small-sized opening 33 results in a pressure drop which limits the volume of water discharged outside the pipe 12 during variations in the height of the upper end 22. This is particularly the case when a resonance phenomenon occurs on the column of water located inside the passage 28.

The fluid transport pipe 12 is provided at its lower end 24 with a device 32 for controlling its filling and for injecting a water process fluid.

With reference to FIG. 2, the control device 32 comprises an upstream section 34 for introducing water, injector 36 for injecting a process fluid into the water introduced by the upstream section 34, and a linking intermediate section 38.

The control device 32 also comprises a downstream section 40 for connection to the pipe 12, a liquid volume compensation reservoir 42 defining a variable volume 44 for receiving liquid, and a connector 46 suitable for connecting the intermediate section 38, the downstream section 40, and the liquid volume compensation reservoir 42.

The sections 34, 38, 40, the equipment 36, the connector 46 and the volume compensation reservoir 42 are preferably supported on a common frame (not shown).

The upstream section 34 defines an inlet 48 for introducing water. The introduction inlet 48 opens into a water guide opening 50 extending through the upstream section 34, the intermediate section 38, the connector 46, and the downstream section 40.

The upstream section 34 is provided with a filter 52 interposed in the passage 50 in order to eliminate the solid elements of macroscopic size sucked through the introduction inlet 48.

In this example, the upstream section 34 is connected to the intermediate section 38 via the process fluid injection assembly 36.

The process fluid injection assembly 36 comprises a process fluid reservoir 54 and at least one pump 56 suitable for discharging process fluid from the process fluid reservoir 54 in order to mix it with the water introduced through the downstream section 34.

In the example shown in FIG. 2, the process fluid contains an anti-corrosion agent. Alternatively or in addition, the process fluid may contain a biocide.

The pump 56 in this case is a passive pump. It is suitable for being actuated by the displacement of the water introduced through the downstream section 34 and flowing towards the fluid transport pipe 12.

The circulation of the water causes, for example, the displacement of a process fluid pumping piston in a reciprocating manner in order to pump process fluid into the process fluid reservoir 54, while ejecting it mixed with water coming from the upstream section 34 in the intermediate section 38.

Alternatively, the pump 56 may be a passive venturi pump.

According to another variant, the pump 56 may be an active pump driven by an electric and/or hydraulic motor, for example driven from the surface 18.

The intermediate section 38 is mounted at the outlet of the injector 36 to receive the discharge of the pump 56. It has an internal cross-section S1 taken at the connector 46 that is less than the internal cross-section S of the pipe 12, taken at the lower end 24.

The downstream section 40 is applied to the connector 46, opposite the intermediate section 38. It is preferably in the form of a flexible pipe.

The internal cross-section S2 of the downstream section 40 is smaller than the internal cross-section S of the pipe 12 taken at the lower end 24. The cross-section S2 is larger than the cross-section S1 of the water inlet opening 33.

The downstream section 40 is mounted in a sealed manner on the lower end of the pipe 12 at the section reducer 31, and surrounding the water inlet opening 33.

The liquid volume compensation reservoir 42 comprises a support 58 fixedly mounted on the connector 46, at least one member 60 for delimiting the receiving volume 44, and that may be displaced or deformed with respect to the support 58.

In the example shown in FIG. 2, the support 58 is a jacket opening into the connector 46, while the delimiting member 60 is a piston mounted to be displaceable in the jacket.

The internal volume 44 is delimited partially by the support 58 and partially by the member 60, which seals it in a sealed manner. It opens into the connector 46 through an inlet cross-section S3 much greater than the cross-section S1 of the intermediate section 38.

The cross-section S3 is greater than 40 times the cross-section S1, preferably greater than 150 times the cross-section S1.

Thus, due to the very low pressure drop in the volume compensation reservoir 42 relative to the intermediate section 38, when water is discharged through the pipe 12 to the device 32, substantially all of the water is capable of being directed towards the receiving volume 44 of the volume compensation reservoir 42, rather than towards the intermediate section 38 leading to the pump 56.

Furthermore, the cross-sectional area S3 of the volume compensation reservoir 42 is greater than or equal to the internal cross-section S of the pipe 12, taken at the end 24, away from the section reducer 31.

In this example, one face of the delimiting member 60 opposite the receiving volume 44 is in contact with the stretch of water 14 through an opening 64 delimited in the support 58.

However, the delimiting member 60 is displaceable under the effect of a low differential pressure between the receiving volume 44 and the stretch of water 14.

Preferably, the delimiting member 60 is designed to move when the absolute value of the difference between the pressure in the receiving volume 44 and the hydrostatic pressure in the water 14 in contact with the delimiting member 60, is greater than or equal to 0.1 bar, advantageously greater than or equal to 0.05 bar, preferably greater than or equal to 0.01 bar.

This allows filling of the receiving volume 44 of the volume compensation reservoir 42 by offering very little resistance to the water which fills it from the pipe 12. As a result, the pressure of the liquid in the receiving volume 44 of the volume compensation reservoir 42 is almost equal to the hydrostatic pressure in the stretch of water 14 in the immediate vicinity of the filling control device 32.

As long as the volume of liquid present in the reservoir 42 is less than the maximum volume it may contain, the pressure difference between the hydrostatic pressure to which the delimiting member 60 is subjected, and the pressure of the liquid in the receiving volume is less than 0.1 bar, advantageously less than or equal to 0.05 bar, preferably less than or equal to 0.01 bar.

The maximum volume 44 accommodated by the volume compensation reservoir 42 is, for example, greater than the product of the internal cross-section S of the pipe 12 and the amplitude of the variation in height of the surface assembly 20. Thus, for example, for a pipe 12 with an internal diameter of 400 mm laid by a surface assembly 20 and subjected to variations in height of 3 m under the influence of the swell, the maximum volume 44 is of the order of 400 liters.

In order to be able to use the same filling control device 32 for different laying operations concerning pipes of different diameters and under different swell conditions, it is advantageous to use a volume compensation reservoir 42 having a large volume capacity. Thus, the maximum volume accommodated by the volume compensation reservoir 42 is advantageously greater than 100 liters, preferably greater than 300 liters, more preferably greater than 500 liters, particularly preferably greater than 700 liters, most preferably greater than 1000 liters.

The connector 46 is a T-connector connecting the intermediate section 38, the downstream section 40 and the volume compensation reservoir 42. Preferably, the receiving volume 44 opens downwards into the connector 46, while the sections 38 and 40 open out laterally into the connector 46.

A method of laying the pipe 12 will now be described.

Initially, the filling control device 32 is mounted at the lower end 24 of a section 30 of the pipe 12 intended to be immersed to form a fluid conveying assembly.

Then successive sections 30 of the pipe 12 are assembled or unwound from the surface assembly 20 in order to lower and immerse an increasing length of the pipe 12 in the stretch of water 14 together with the device 32.

During the lowering, water present in the stretch of water 14 enters the guide opening 50 of the upstream section 34 through the introduction inlet 48. The water is filtered in the filter 52 to eliminate significant solid residues.

The water then passes into the pump 56, which causes the withdrawal of process fluid from the reservoir 54 and its mixing with the water conveyed in the intermediate section 38.

In its filling configuration, the internal volume 44 of the volume compensation reservoir 42 is minimal. The delimiting member 60 is located in the vicinity of the connector 46.

Water containing the process fluid then rises in the downstream section 40 and enters the internal passage 28 of the conveying pipe 12 through the water inlet opening 33.

The pipe 12 is then filled progressively with water containing process fluid that is intended to prevent internal corrosion and ensure protection.

As illustrated in FIG. 3, during a downward movement of the surface assembly 20 under the effect of the movements of the surface 18 of the stretch of water, the upper end 22 of the pipe 12 descends together with the surface assembly 20. An additional volume of water VA is drawn through the device 32 into the pipe 12.

With reference to FIG. 4, when the surface assembly 20 rises, the upper end 22 of the pipe rises simultaneously, causing at least a partial downward discharge of the additional volume VA that was sucked in during the rise.

The discharged water enters the device 32 through the opening 33, the downstream section 40 as far as the connector 46, and generates a local overpressure in the connector 46. However, the inlet cross-section S3 of the accumulator 42 being much greater than the internal cross-section S1 of the intermediate section 38, almost all of the discharged water flows to the receiving volume 44 rather than to the pump 56.

The delimiting member 60 moves to increase the receiving volume 44 and accommodate the discharged water. As long as the receiving volume 44 is not filled, the local overpressure in the connector 46 is limited to the pressure difference necessary to move the delimiting member 60, i.e. at a very low value.

Thus, no deterioration of the pump 56 takes place. The risk of contamination of the stretch of water 14 with water containing process fluid is also virtually eliminated.

The presence of the water inlet opening 33 on the section reducer 31 also limits the quantity of discharged water, in particular in the event of resonance on the water column present in the internal passage 28 of the pipe 12.

The presence of the control device 32 thus provides an at least partial progressive filling of the pipe 12 by the water from the stretch of water 14 and the injection of a process fluid to prevent deterioration of the pipe 12.

The laying is thus facilitated and accelerated by the presence of the water introduced into the pipe 12.

Even if the movements of the surface 18 of the stretch of water 14 are significant during the laying, for example in the order of 3 m, the quantity of water contained in the pipe 12 and the movements of this water are, in particular, controlled by the reception of the water discharged into the volume compensation reservoir 42 and its passage through the inlet opening 33.

The control device 32 nevertheless retains a simple, inexpensive structure which functions without external intervention.

Figure 5:
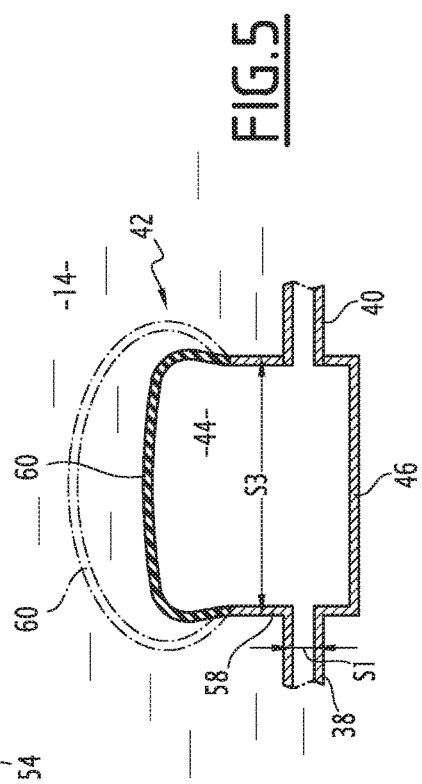
FIG. 5 shows a view of a variant of the fluid volume compensation reservoir for the filling control device according to the invention.

In the variant illustrated in FIG. 5, the volume compensation reservoir 42 comprises a member 60 for delimiting the internal volume 44 which is a deformable membrane mounted on the support 58.

Unlike the volume compensation reservoir 42 shown in FIG. 2, the member 60 is designed to deform in order to increase the receiving volume 44 and to accommodate the water discharged from the pipe 12.

Moreover, the operation of the control device 32 is analogous to that described above.

The invention claimed is:

1. A device configured for controlling the filling of a fluid transport pipe being laid in a stretch of water, comprising:

An upstream section defining a water introduction inlet;

A process fluid injector configured for injecting a process fluid into the water introduced into the upstream section;

An intermediate section mounted downstream of the process fluid injector configured for receiving the water containing process fluid;

A downstream section configured for conveying water to the fluid transport pipe being laid in the stretch of water;

A liquid volume compensation reservoir, having a variable receiving volume of water discharged from the fluid transport pipe, A connector to which the intermediate section, the downstream section and the liquid volume compensation reservoir are connected, an inlet cross-section of the liquid volume compensation reservoir being greater than 40 times an internal cross-section of the intermediate section, taken at the connector.

2. The device according to claim 1, wherein the inlet cross-section of the liquid volume compensation reservoir, taken at the connector, is greater than 150 times the internal cross-section of the intermediate section, taken at the connector.

3. The device according to claim 1, wherein the liquid volume compensation reservoir comprises a delimiter configured for delimiting the receiving volume, and for being displaced or deformed to modify the receiving volume, a face of the delimiter opposite the receiving volume being subjected to the hydrostatic pressure of the stretch of water.

4. The device according to claim 3, wherein the delimiters configured to be displaced or deformed when an absolute value of a difference between a pressure in the receiving volume, and a hydrostatic pressure in the stretch water applied to the delimiter, is greater than or equal to 0.1 bar.

5. The device according to claim 1, wherein a maximum receiving volume accommodated by the liquid volume compensation reservoir is greater than 100 liters.

6. The device according to claim 1, wherein the process fluid injector comprises a pump discharging into the intermediate section.

7. The device according to claim 6, wherein the pump is a passive pump configured to be actuated by the water introduced through the upstream section, or is an active pump comprising at least one electric or hydraulic pump motor.

8. The device according to claim 1, wherein the process fluid injector comprises a process fluid reservoir mounted upstream a pump.

9. The device according to claim 1, wherein the process fluid contains a corrosion inhibitor and/or a biocide.

10. The device according to claim 1, further comprising a filter inserted on the upstream section upstream of the process fluid injector.

11. The device according to claim 1, wherein the downstream section is formed of a flexible hose.

12. A fluid conveying assembly, comprising:

A fluid transport line having a lower end located in a vicinity of a bottom of the stretch of water, and an upper end;

The device according to according to claim 1, the downstream section being mounted at a lower end of the fluid transport pipe, the upstream section opening into the stretch of water.

13. The assembly according to claim 12, wherein the lower end of the fluid transport pipe is provided with a section reducer defining a water inlet opening in the fluid transport pipe, the water inlet opening having a diameter smaller than a diameter of the fluid transport pipe, the downstream section opening into the water inlet opening.

14. The assembly according to claim 13, wherein a cross-section of the water inlet opening is less than 5% of a cross-section of the fluid transport pipe.

15. A method of laying a fluid transport pipe in a stretch of water, comprising the following steps:

Lowering of an assembly according to claim 12 in the stretch of water, Progressive filling of the fluid transport pipe with water from the stretch of water through the upstream section, the intermediate section, the connector and the downstream section, and injection of the process fluid by the process fluid injector into the water introduced into the fluid transport pipe;

Partial discharge of water from the fluid transport pipe through the downstream section;

Filling the receiving volume of the liquid volume compensation reservoir with the water discharged from the fluid transport pipe.

16. The device according to claim 4, wherein the delimiter is configured to be displaced or deformed when an absolute value of a difference between a pressure in the receiving volume, and a hydrostatic pressure in the stretch of water applied to the delimiter, is greater than or equal to 0.05 bar.

17. The device according to claim 4, wherein the delimiter is configured to be displaced or deformed when an absolute value of a difference between a pressure in the receiving volume, and a hydrostatic pressure in the stretch of water applied to the delimiter, is greater than or equal to 0.01 bar.

18. The device according to claim 4, wherein the delimiter is configured to be displaced or deformed when the absolute value of the difference between the pressure in the receiving volume, and the hydrostatic pressure in the stretch of water applied to the delimiter, is greater than or equal to 0.01 bar.

* * * * *